A. A. BOWSER.
COMBINED PUMP AND REGISTERING METER.
APPLICATION FILED SEPT. 16, 1912.
1,250,786. Patented Dec. 18, 1917.
2 SHEETS—SHEET 2.
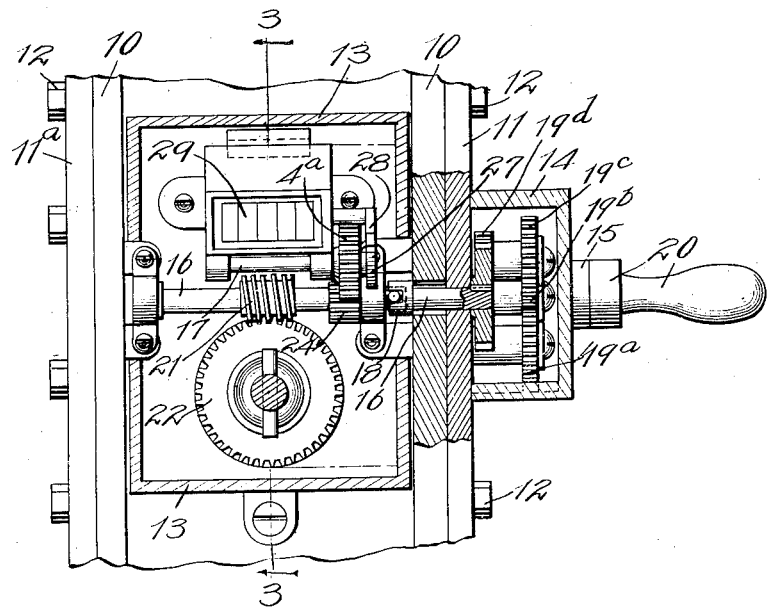
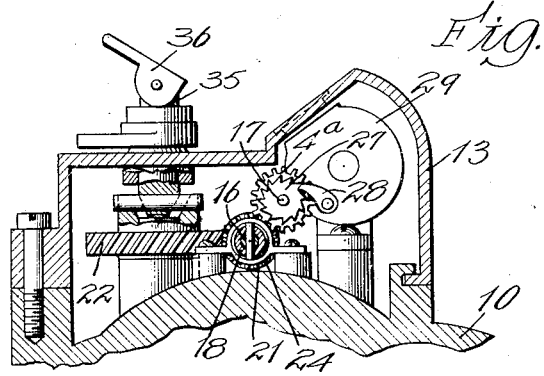
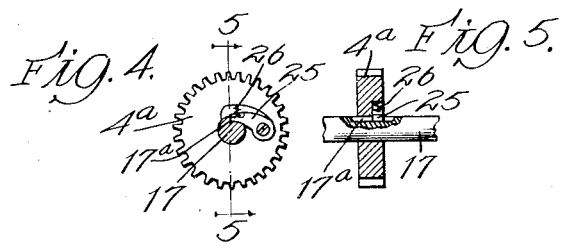
Witnesses:
Inventor:
Allen A. Bowser
By Brown Hopkins
Attys.

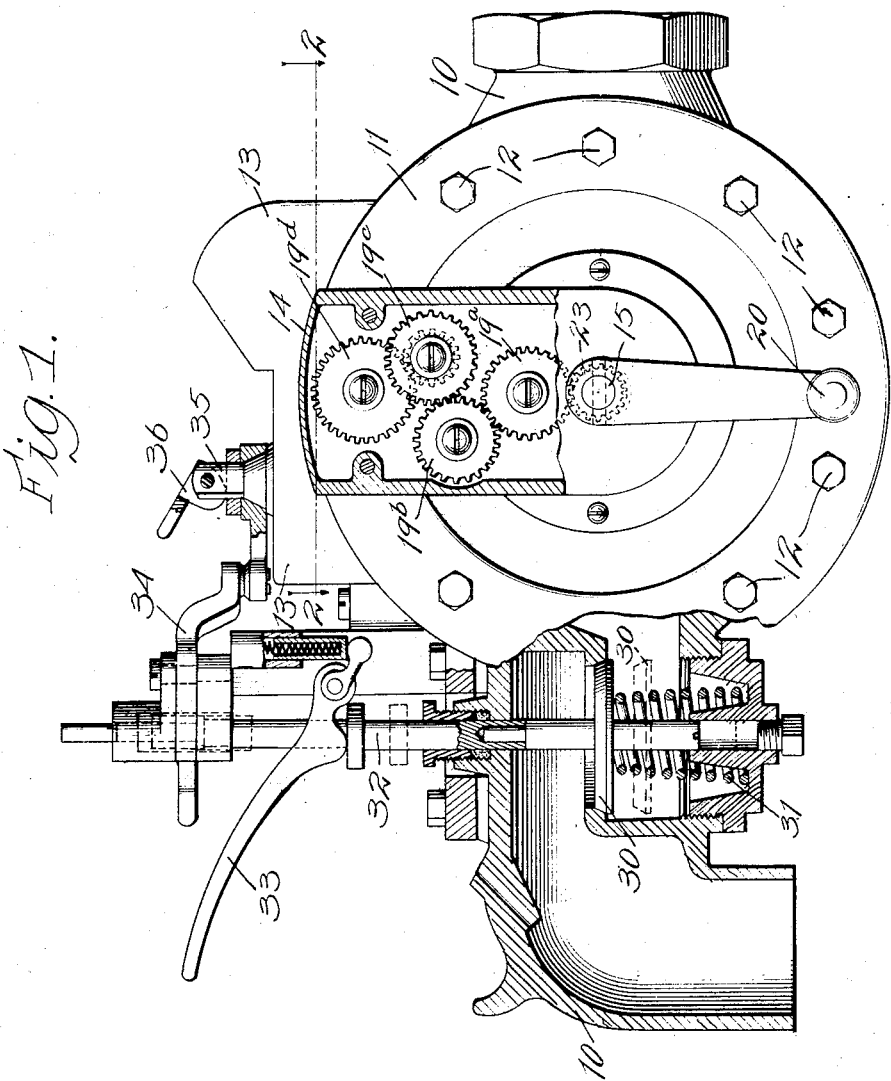

UNITED STATES PATENT OFFICE.

ALLEN A. BOWSER, OF FORT WAYNE, INDIANA, ASSIGNOR TO S. F. BOWSER & COMPANY, INCORPORATED, OF FORT WAYNE, INDIANA, A CORPORATION OF INDIANA.

COMBINED PUMP AND REGISTERING-METER.

1,250,786.     Specification of Letters Patent.     Patented Dec. 18, 1917.

Original application filed May 26, 1910, Serial No. 563,470. Divided and this application filed September 16, 1912. Serial No. 720,468.

*To all whom it may concern:*

Be it known that I, ALLEN A. BOWSER, a citizen of the United States, residing at Fort Wayne, in the county of Allen and State of Indiana, have invented certain new and useful Improvements in Combined Pumps and Registering-Meters of which the following is a specification.

This invention relates to combined pumps and registering meters and has for its primary object the provision of an improved pump and registering meter which shall have means whereby the registering portion thereof may be made to operate when the pump is operated in one direction, but will not operate when the pump is operated in the opposite direction.

To the attainment of this end, and the accomplishment of other objects, which will appear from this specification and the accompanying drawings showing the preferred embodiment of my invention, the invention consists in the combinations and improvements set forth in the sub-joined claims.

In said drawings,

Figure 1 is a side elevation partly in section with some parts broken away, of a combined pump and registering meter embodying this invention.

Fig. 2 is a plan section thereof taken on line 2—2, Fig. 1, showing parts of the outer casing broken away.

Fig. 3 is a vertical section on line 3—3, Fig. 2, showing parts of a tripping mechanism in side elevation.

Fig. 4 is a detail side elevation of a gear wheel hereinafter described.

Fig. 5 is a section thereof taken approximately on line 5—5, Fig. 4.

This application is a division of my application Serial No. 563,470, filed in the United States Patent Office May 26, 1910.

A suitable casing for the mechanism of the combined pump and registering meter is indicated at 10, 11 and 11ª being outer facings removably attached thereto by cap screws 12. Casing 10 is preferably provided with a removable portion 13 covering the register mechanism, and 14 is a removable casing covering a train of gear wheels 19ª, 19ᵇ, 19ᶜ, 19ᵈ presently to be described. The register mechanism 29 is directly operated by register shaft 17 which receives its motion through a gear wheel 4ª rotatably mounted upon it, a pinion 24 in mesh with said gear wheel and rigidly mounted on a discontinuous operating shaft 16, and the train of gear wheels 19ᵈ, 19ᶜ, 19ᵇ, 19ª, which are in turn actuated by pinion 23 rigidly mounted upon the pump shaft 15. The pump shaft 15 is rotated by means without the casing of the pump, such as the handle, indicated at 20. When the pump shaft 15 is rotated in one direction, in addition to its pumping action, it operates the register mechanism 29. In order that a dishonest operator may not by the rotating of pump shaft 15 in the opposite direction cause the register mechanism 29 to operate in a reverse manner, register shaft 17 is notched as at 17ª and the gear wheel 4ª carries a pawl 25 and an elastic member 26, the pawl engaging the notch 17ª and thereby turning the shaft 17 when the pump shaft is rotated in the one direction and slipping over the notch 17ª when the pump shaft 15 is rotated in the opposite direction, thereby causing gear wheel 4ª to idle upon the register shaft 17. As a means of protecting the register mechanism 29 against retrograde movement from any other source than the reverse rotation of the pump shaft 15, a ratchet wheel 27 is preferably provided mounted on register shaft 17. A pawl 28 is provided which, by engagement with the ratchet wheel, locks register shaft 17 against retrograde movement. The pump and meter which are contained within the casing 10 are not shown in the drawings, inasmuch as they are described in detail in my application Serial No. 439,397, filed in the United States Patent Office June 19, 1908. To afford easy access to the pump and meter without disturbing the mechanism contained in the removable casing 13, the two portions of the discontinuous operating shaft 16 are joined for rotation, as at 18, by means of a bifurcated head on one portion and a transverse pin with projecting ends upon the other portion. In this manner, by the removal of rotating means 20 and the cap screws 12, facing 11 with outer casing 14 and the train of wheels 19ª, 19ᵇ, 19ᶜ and 19ᵈ may be readily removed.

The valve 30, the elastic member 31, the shaft 32, the levers 33 and 34, the shaft 35, the cam 36, the worm wheel 22 and the worm gear 21 constitute parts of an automatically tripped valve which is not described in detail as it forms part of my application, Serial No. 563,470, filed in the United States Patent Office May 26, 1910.

The pump handle 20, the pump shaft 15, the gear wheel 23, the gear wheels 19$^a$, 19$^b$, 19$^c$, 19$^d$, the outer casing 10, the facing 11, the bolts 12, the outer casings 13 and 14 and the discontinuous operating shaft 16, though described heretofore in my application Serial No. 563,470 filed in the United States Patent Office May 26, 1910, are here described for the reason that they are the preferred mechanism for carrying the motion of the pump shaft 15 to the pinion 24.

I claim:

1. The combination with a reversible metering pump, of a registering device, and means for connecting the pump and the registering device when the liquid is pumped in one direction and for idling the registering device when the liquid is pumped in a reverse direction.

2. The combination with a rotatable metering pump, of a registering device, means for transmitting the rotary motion of the pump to the registering device when the liquid is pumped in one direction, and means for idling the registering device when the liquid is pumped in the reverse direction.

3. The combination with a reversible metering pump, of a registering device having an operating shaft, a driving connection for transmitting the motion of the pump shaft to the shaft of the registering device when liquid is pumped in one direction, and means for idling the register shaft when the liquid is pumped in the opposite direction.

4. The combination with a reversible metering pump having a rotatable operating shaft, of registering device having a shaft, a pinion upon the operating shaft and a gear wheel upon the register shaft, said gear wheel carrying means for actuating the register shaft when the pump shaft is turned with the liquid in one direction and for idling the register shaft when the pump is turned with the liquid in the opposite direction.

5. The combination with a reversible liquid pump having a rotatable shaft and a pinion thereon, of a registering device having a shaft and a gear wheel thereon, a notch in the register shaft adjacent said gear wheel, a pawl pivoted on the gear wheel and an elastic member adapted to engage the pawl with the notch when the movement of the liquid is in one direction and to slide over the notch when the movement of the liquid is in the opposite direction.

6. The combination with a reversible metering pump having a casing and a pump shaft and means without the casing for actuating the pump shaft, of a registering device having a rotatable operating shaft, means transmitting the motion of the pump shaft to the register shaft when the movement of the liquid is in one direction, and additional means for idling the register shaft when the movement of the liquid is in the opposite direction.

7. The combination with liquid operating mechanism and a registering device, of means for connecting the mechanism and the registering device when the movement of the liquid is in one direction, and means for idling the registering device when the movement of the liquid is in the opposite direction.

In testimony whereof I have signed my name to this specification, in the presence of two subscribing witnesses, on this 13th day of September, A. D. 1912.

ALLEN A. BOWSER.

Witnesses:
J. R. MATLACK,
C. M. SMITH.